DIGITAL-TO-ANALOG CONVERTER
Filed July 22, 1959
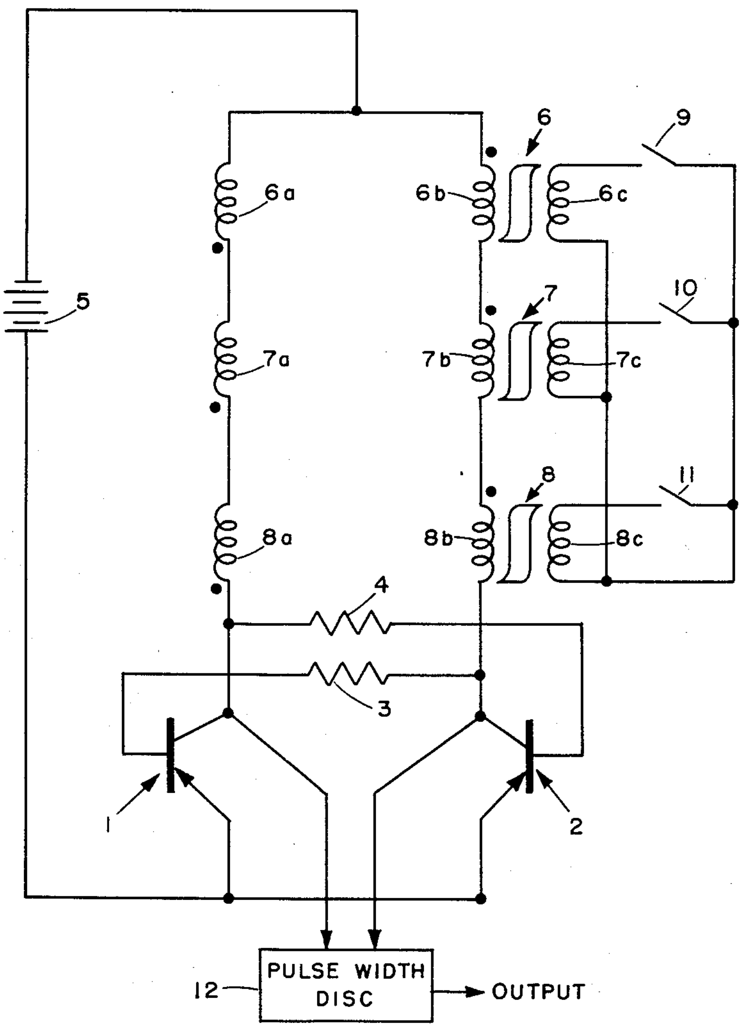
Roland L. Van Allen
*INVENTOR.*
BY Louis I. Shrago 2,994,864
DIGITAL-TO-ANALOG CONVERTER
Roland L. Van Allen, Butler, Pa.
Filed July 22, 1959, Ser. No. 828,920
9 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

The present invention relates generally to electrical data transformation circuits and more particularly to apparatus for and methods of performing a digital-to-analog conversion.

In data handling systems it is oftentimes desirable to transform the results of a digital computing operation into analog form for presentation, interpretation or further computation purposes.

It is accordingly a primary object of the present invention to provide a circuit for converting digital information into analog form.

A secondary object of the present invention is to provide a digital-to-analog converter which utilizes miniature components.

A still further object of the present invention is to provide a circuit for converting a digital code into a variable frequency wave form whose period is proportionally related to the magnitude of the quantity represented by said code.

A still further object of the present invention is to provide a digital-to-analog converter which employs a saturable core multivibrator in the converting circuit.

A still further object of the present invention is to provide a miniaturized digital-to-analog converter wherein the electrical components are transistors and saturable core reactors.

A still further object of the present invention is to provide an arrangement for changing the frequency of a saturable core multivibrator by discrete amounts.

Briefly and in general terms, the above objects are realized according to the present invention by utilizing as one of the components in the converter a free-running multivibrator whose period may be changed by finite amounts by effectively connecting different permutations of saturable core reactors having unequal volt-second capacities into its control circuit. Each of these saturable core reactors carries a control winding, and switching means is provided for selectively open-circuiting or short-circuiting certain of these windings in accordance with the permutations of the binary code. Whenever one of these control windings is short-circuited, its core is prevented from exercising any control over the period of the multivibrator. The output of the multivibrator is fed to a pulse width discriminator which develops the desired analog voltage.

Other objects and many of the attendant advantages of this invention will be readily appreciated as the same becomes better understood by reference to the following detailed description when considered in connection with the accompanying drawing.

Referring now to the drawing, the single figure of which schematically illustrates a preferred embodiment of the invention, a pair of pnp transistors 1 and 2 forwardly biased by voltage source 5 have their bases and collectors cross-coupled via resistors 3 and 4 to form a free-running multivibrator circuit. The period of this multivibrator, as will be seen hereinafter, is determined by the volt-second capacities of a multiplicity of saturable core reactors 6, 7 and 8 which have rectangular hysteresis curves. Each of these reactors has three windings, *6a*, *6b*, *6c*; *7a*, *7b*, *7c*; *8a*, *8b*, *8c*, the relative polarity of each winding where it is significant being indicated by the dot adjacent thereto. For purposes of discussion, only three saturable core reactors are shown, but it will be understood that the number of reactors required depends upon the number of units in the binary code being translated. One group of reactor windings, the series combination of 6a, 7a, 8a, is connected in the collector circuit of transistor 1. Another group of reactor windings, the series combination of 6b, 7b and 8b, is likewise connected in the collector circuit of transistor 2; and a third group of reactor windings, the parallel combination of 6c, 7c and 8c, is under the control of switches 9, 10 and 11 which open-circuit or short-circuit selected ones of these windings according to the makeup of the binary code being converted.

The volt-second capacities of these saturable cores vary in magnitude according to the series $2^0$, $2^1$, $2^2$, etc. This sequence, it will be seen, is preferred since it gives a linear relationship between the period of the multivibrator and the value of the binary code. Thus, the core of saturable reactor 6 which is under the control of switch 9, which is set according to the first unit of the binary code, may have a one millivolt-second capacity; while that of saturable reactor core 7, controlled by switch 10, which is set according to the second unit of the binary code, may have a two millivolt-second capacity; and that of saturable reactor 8, a four millivolt-second capacity. It will be appreciated, of course, that where a fourth and fifth saturable core reactor are needed, these cores would have an eight and sixteen millivolt-second constant, respectively.

The operation of the circuit is as follows: Initially, voltage source 5 biases both transistors equally in a forward direction so that current flows from this source via both transistors through the series combinations of windings 6a, 7a, 8a and 6b, 7b, 8b. However, during the transient state, it may be assumed that one or the other of these transistors carries the greater instantaneous current. If this is transistor 1, then the voltage at its collector is slightly more positive than that existing at the collector of transistor 2. This higher positive voltage is coupled via resistor 4 to the base of transistor 2, thereby reducing the current flow therethrough and increasing its emitter-to-collector impedance. As a consequence, the collector potential of transistor 2 moves in a negative direction, and this negative-going voltage appears as a result of coupling resistor 3 at the base of transistor 1, thereby further increasing the current flow through this resistor and diminishing its emitter-to-collector impedance. The collector of transistor 1 thus moves to a higher positive level and the above regenerative effect, as is well known, rapidly results in transistor 1 carrying all the current and transistor 2 being blocked. Once the above switching has taken place, current flows from source 5, through transistor 1 alone to windings 6a, 7a and 8a of the saturable core reactors. If the effect of control windings 6c, 7c and 8c and their associated single pole switches 9, 10 and 11 is disregarded for the time being, it will be seen that the cores of the different saturable core reactors are driven to saturation in a first direction and that the total time required to saturate all three reactors is proportional to the sum of the volt-second capacities of their cores.

As soon as all three cores are saturated, the multivibrator is triggered to its other stable condition, since the voltage at the collector of transistor 1, which is rapidly approaching the negative level of source 5, appears at the base of transistor 2 and unblocks this transistor. The switching action which follows and results in transistor 2 carrying all the current and transistor 1 being blocked is the same as that hereinbefore set forth. During this half of the multivibrator cycle, the cores will again saturate, but this time the direction of core saturation will be reversed from that attained in the previous half cycle due to the opposite polarities of windings *6b*, *7b* and *8b*. Again, when all the cores reach saturation, the multivibrator is retriggered and the cycle continues.

From the above discussion, it will be seen that transistors 1 and 2 and the saturable core reactors in their collector circuits form a multivibrator, the period of which is governed by the total time required to drive all the cores from one condition of saturation to an opposite condition of saturation and at this time is equivalent to the sum total of the various volt-second capacities of the cores.

Now, turning to the effect of control windings *6c*, *7c* and *8c*, these windings are adapted to be individually open-circuited or short-circuited, depending upon the positions of single pole switches 9, 10 and 11, which are set in accordance with the binary code being translated. For example, switch 9 assumes a position in accordance with the first unit of the code such that its open position stands for a "0" and its closed position a "1." Likewise, switch 10 assumes an open position when the second unit of the code is "0" and a closed position when this unit is "1," and the same is true with respect to switch 11 and any other switches which may be added to the circuit.

When one of these switches is closed and its associated winding directly short-circuited, the volt-second capacity of the core in question is effectively reduced to zero. Thus, for example, if switch 9 is closed and switches 10 and 11 open when transistor 1 is carrying all the current, winding *6a* absorbs no volt-seconds and, consequently, the period of the multivibrator is determined solely by the volt-second capacities of reactors 7 and 8.

By way of a schedule, it would be pointed out that where the binary core 000 is being converted all the switches are open so that the period of oscillation of the multivibrator is, in the example selected, seven milliseconds, that is, the volt-second capacities of saturable cores 6, 7 and 8; that for the binary code 001, switch 9 is closed and the period decreases to six milliseconds, the volt-second capacities of saturable reactors 7 and 8; that for the 010 code, switch 10 alone is closed and the period is further reduced to five milliseconds, the volt-second capacity of saturable reactors 6 and 8; and that for 011, switches 9 and 10 are closed and the period further reduced to four milliseconds, the volt-second capacity of saturable core reactor 8. The minimum period of the multivibrator, of course, occurs when all switches are closed.

In order to produce the desired analog output, the output voltage of the multivibrator as it appears across the collectors of the transistors is fed to a conventional pulse width discriminator 12. This circuit, as is well known, produces a voltage whose amplitude is directly proportional to the length of the pulse fed thereto.

Although the preferred embodiment just described makes use of transistors as the switching elements of the multivibrator for miniaturization and power purposes, it will be obvious to anyone skilled in the art that vacuum tubes could be used to carry out this function, if desired. Such a substitution, of course, would not change the fundamental mode of operation of the circuit. Furthermore, it would be appreciated that while switches 9, 10 and 11 are set in accordance with a binary code to discretely change the frequency of the multivibrator, this technique of short-circuiting the control windings of a series of saturable core reactors of unequal volt-second capacities may be resorted to to simply regulate the frequency of a saturable core multivibrator circuit.

Obviously many modifications and variations of the present invention are possible in the light of the above teachings. It is therefore to be understood that within the scope of the appended claims the invention may be practiced otherwise than as specifically described.

What is claimed is:

1. Apparatus for converting binary information to analog form comprising, in combination, a free-running saturable core multivibrator, said multivibrator having in its control circuits a series of saturable core reactors having different volt-second capacities, said multivibrator switching from one semi-stable state to another whenever all of said saturable core reactors reach saturation, means for altering the effective total volt-second capacities of said saturable core reactors in accordance with the permutation of the binary code, and means for producing a voltage whose amplitude is dependent upon the period of said multivibrator.

2. In an arrangement for converting digital information to analog form, the combination of a multivibrator circuit, said multivibrator having its period determined by the total volt-second capacities of a multiplicity of saturable core reactors, the number of saturable core reactors corresponding to the number of units in the binary code, means for changing the volt-second capacities of selected ones of said saturable core reactors in accordance with the permutation of said binary code whereby the period of said multivibrator is proportional to the numerical value represented by said binary code, and means for deriving an output voltage whose amplitude is proportional to the period of said multivibrator.

3. A binary code-to-analog converter comprising in combination, a saturable core multivibrator, the period of said multivibrator being determined by the total volt-seconds capacity of a multiplicity of saturable core reactors connected in the control circuit of said multivibrator, said saturable core reactors having different volt-second capacities, means for reducing the volt-second capacities of predetermined ones of saturable core reactors to substantially zero in accordance with the permutation of the binary code whereby the period of said multivibrator is proportional to the magnitude of the quantity represented by said binary code, and a discriminator for deriving a voltage whose amplitude is proportional to the period of said multivibrator.

4. A binary code-to-analog converter comprising, in combination, a multivibrator circuit, the period of said multivibrator being determined by the total volt-second capacities of a multiplicity of saturable core reactors located in its control circuit, said saturable core reactors having unequal volt-second capacities, means associated with each saturable core reactor for reducing its volt-second capacity to approximately zero whereby each particular saturable core reactor so reduced has no effect in determining the period of said multivibrator, said last-mentioned means being controlled by the composition of the binary code, and means for producing an output voltage whose amplitude is dependent upon the period of said multivibrator.

5. A binary code-to-analog converter comprising, in combination, a transistor multivibrator, said multivibrator including first and second pnp transistors, said transistors being biased in a forward direction with their bases and collectors cross-coupled, a plurality of multi-winding saturable core reactors, said saturable core reactors having unequal volt-seconds capacities, means for connecting a winding of each of said saturable core reactors in the collector circuits of each transistor whereby the period of said multivibrator is determined by the total volt-second capacities of said saturable core reactors, and means for selectively reducing the volt-seconds capacity of certain of said saturable core reactors to approximately zero in accordance with the composition of the binary code whereby the period of said multivibrator is determined by the magnitude of the quantity represented by said binary code, and means for developing a voltage the amplitude of which corresponds to the period of said multivibrator.

6. A binary code-to-analog converter comprising a first and second pnp transistor, a multiplicity of saturable core reactors, said saturable core reactors each having unequal volt-seconds capacities and each having first, second and third control windings, means for connecting the emitters of both of said transistors to a positive potential, means for connecting the first windings of each of said saturable core reactors in series between the collector of one of said transistors and a negative potential, means for connecting the second windings of each of said saturable core reactors in series between the collector of the other transistor and said negative potential, a resistor connected between the base and collector of each transistor, said first and second windings being oppositely poled with respect to each other whereby current flow therethrough tends to drive the saturable core reactors to saturation in opposite directions, and means for selectively short-circuiting selected ones of the third windings of said saturable core reactors in accordance with the makeup of the binary code whereby the period of the multivibrator formed by said transistors is determined by the total volt-seconds capacities of those saturable core reactors whose third windings are not short-circuited and whereby said period is proportional to the magnitude of the quantity represented by said binary code, and means for developing a voltage whose amplitude is related to the period of said multivibrator.

7. A binary code to analog converter comprising, in combination, a multivibrator circuit, said multivibrator including first and second pnp transistors with their bases and collectors cross-coupled, a multiplicity of saturable core reactors, each of said saturable core reactors having at least a control winding and a load winding, the volt-second capacities of said saturable core reactors being related in accordance with the series $2^0$, $2^1$, $2^2$, etc., means for connecting the load windings of said saturable core reactors in series in a control circuit of said multivibrator such that the period of said multivibrator is determined by the total volt-second capacities of said saturable core reactors, means for short-circuiting selected ones of said control windings in accordance with the composition of said binary code whereby the volt-second capacity of their corresponding reactors are reduced to approximately zero and means for developing a voltage whose amplitude corresponds to the period of said multivibrator.

8. A binary code to analog converter comprising, in combination, a multivibrator having a first and second control circuit, a plurality of saturable core reactors, each of said saturable core reactors having a control winding and a first and second load winding, the volt-second capacities of said saturable core reactors being unequal, means for connecting said first load windings in series and said second load windings in series in said first and second control circuits, respectively, whereby said multivibrator changes its mode of conduction when said plurality of saturable core reactors become saturated, means for short-circuiting selected ones of said control windings in accordance with the permutation of the binary code being converted whereby the volt-second capacities of their reactors are reduced to zero and means for deriving a voltage whose amplitude is related to the period of said multivibrator.

9. A binary code to analog converter comprising, in combination, a first and second pnp transistor, a saturable core reactor for each unit of the binary code which is being converted, said saturable core reactors having unequal volt-second capacities which are related in accordance with the series $2^0$, $2^1$, $2^2$, etc., and each having first, second and third windings, means for connecting the emitters of both the said transistors to a positive reference potential, means for connecting the first windings of each of said saturable core reactors in series between the collector of one of said transistors and a potential negative with respect to said reference potential, means for connecting the second windings of each of said saturable core reactors in series between the collector of the other transistor and said negative potential, a resistor connected between the base and collector of each transistor, said first and second windings being oppositely poled with respect to each other whereby current flow therethrough tends to drive the saturable core reactors to saturation in opposite directions, means for short-circuiting selected ones of said third windings in accordance with the composition of the binary code whereby the period of the multivibrator formed by said transistors is proportional to the magnitude of the quantity represented by said binary code and means connecting the collectors of both transistors to a pulse width discriminator for developing a voltage whose amplitude is proportional to the period of said multivibrator.

References Cited in the file of this patent

UNITED STATES PATENTS

| | | |
|---|---|---|
| 2,704,842 | Goodell | Mar. 22, 1955 |
| 2,870,436 | Kuder | Jan. 20, 1959 |
| 2,894,250 | Rochelle | July 7, 1959 |
| 2,907,021 | Woods | Sept. 29, 1959 |
| 2,907,991 | Van Allen | Oct. 6, 1959 |
| 2,924,711 | Kertzmer | Feb. 9, 1960 |